Patented Dec. 21, 1937

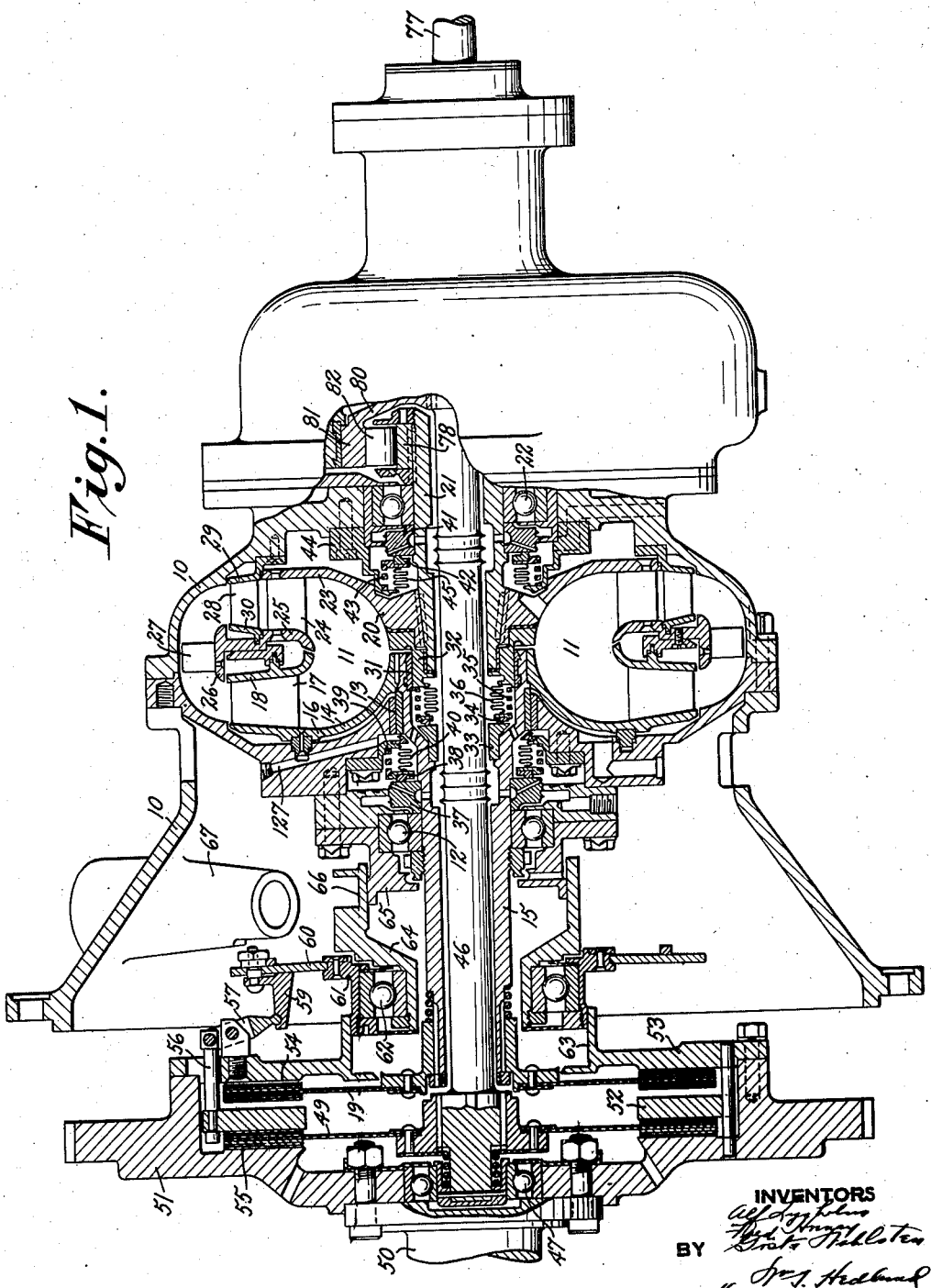

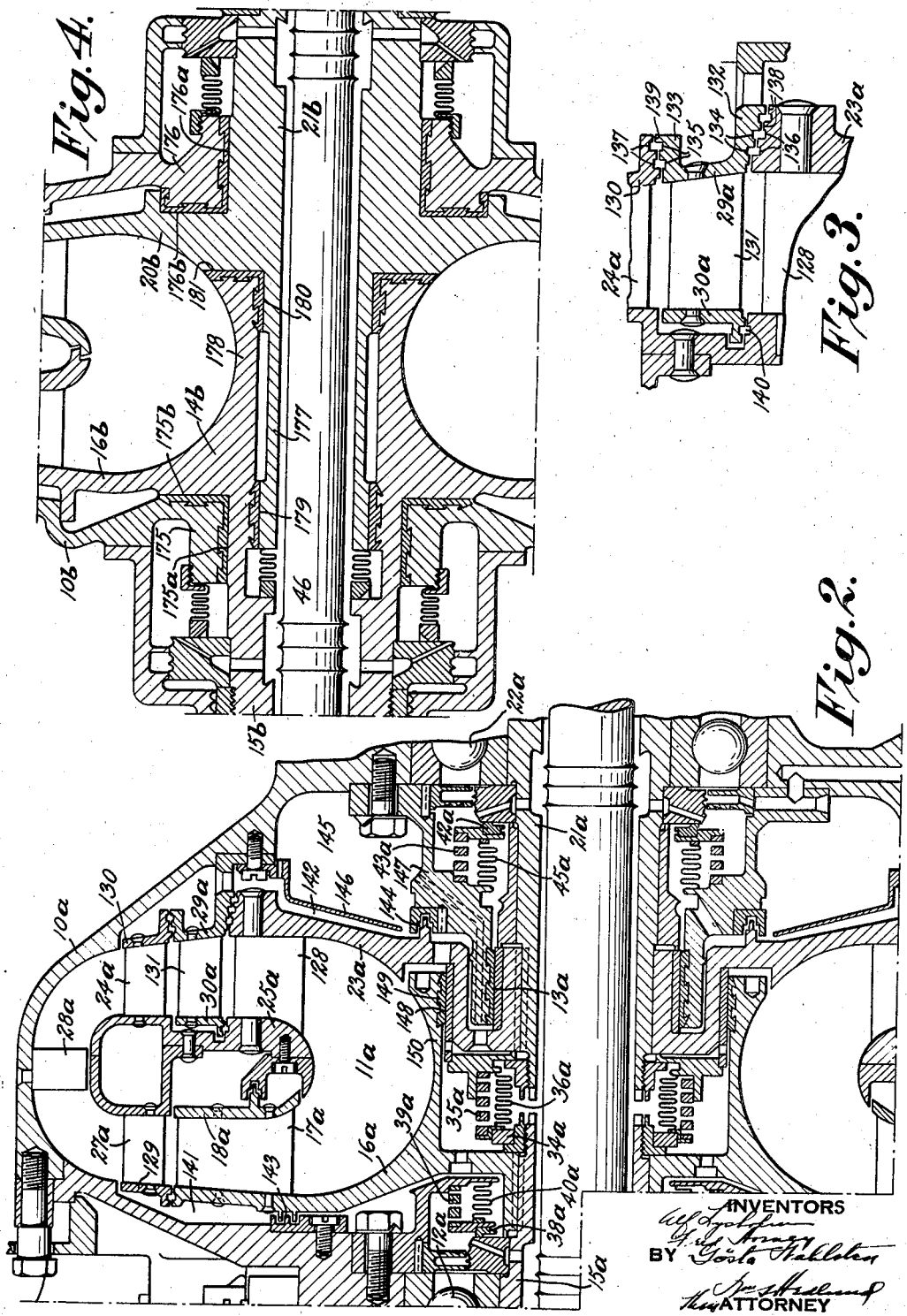

2,102,635

UNITED STATES PATENT OFFICE 2,102,635

VARIABLE SPEED POWER TRANSMISSION

Alf Lysholm, Fred Horney, and Gösta Wahlsten, Stockholm, Sweden, assignors to Aktiebolaget Ljungstroms Ångturbin, Stockholm, Sweden, a corporation of Sweden Original application March 3, 1933, Serial No. 659,500. Divided and this application November 21, 1934, Serial No. 754,080. In Germany January 14, 1931

6 Claims. (Cl. 60—54)

This application is a division of our copending application Serial No. 659,500, filed March 3, 1933, and as such is a continuation in part with respect to our application Serial No. 585,440 filed January 8, 1932, which has matured into Patent No. 1,900,119 granted March 7, 1933, and relates back as to all common subject matter for all dates and rights incident to the filing of said applications Serial Nos. 659,500 and 585,440.

The present invention relates to variable speed power transmissions and has particular reference to variable speed power transmissions of the type in which hydraulic variable speed mechanism is combined with mechanical power transmitting mechanism to provide for automatic variable speed ratios and positive direct drive to a driven shaft.

In its several phases the invention aims to improve upon transmissions of the above stated character, particularly with respect to features of construction of the hydraulic variable speed mechanism whereby such mechanism is made more advantageously usable in a structure embodying the feature of direct mechanical drive, and whereby the hydraulic mechanism may be more compactly and advantageously employed than in prior forms of construction.

With the above general and other and more specific aims in view, which will appear more fully in the ensuing description, the invention consists in the novel structural parts and combinations defined in the appended claims.

For purposes of illustration, we have shown the invention in several practical embodiments of transmission structure suitable for carrying the invention into effect, and in the several drawings:

Fig. 1 is a central longitudinal section partly in elevation of a transmission embodying the invention;

Fig. 2 is a similar section on a larger scale of the hydraulic portion of a transmission of the same general character as that illustrated in Fig. 1;

Fig. 3 is a section on a still larger scale of part of the structure shown in Fig. 2; and Fig. 4 is a central longitudinal section of part of the hydraulic mechanism of still another embodiment of the invention.

Referring now to Fig. 1, the transmission illustrated therein comprises a casing 10 adapted to be non-rotatably mounted in the frame of a vehicle or the like and providing a main annular chamber 11 for circulation of operating fluid. The primary or driving member 14 of the hydraulic power transmitting mechanism is mounted as by means of ball bearing 12 and journal bearing 13 at the central longitudinal axis of the transmission within the casing 10. Member 14 comprises a hollow shaft part 15, this part being the part journalled in the bearings, and a disc-like impeller part 16 located within the chamber 11, and carrying a ring of impeller or pump blades 17, the axially inner ends of which are joined by an annular ring 18. At its forward end the shaft part 15 of the primary member has splined thereto a clutch plate 19. The secondary or driven member 20 of the hydraulic power transmitting mechanism comprises a hollow shaft part 21 rotatably mounted in co-axial alignment with shaft part 15 of the primary member and supported in housing 10 by ball bearing 22. Member 20 also comprises an impelled or turbine part 23 situated in chamber 11, and comprising a disc-like portion carrying a ring of turbine blades 24, which at their inner ends are joined by and support an annular ring 25. Ring 25 extends radially outwardly from the portion attached to blades 24, and at its outer part has an axially extending circular flange 26 which supports a ring of radially extending turbine blades 27, the outer ends of which extend to within a short distance of the casing 10. Between the rings of turbine blades 27 and 24 there is situated a ring of stationary guide blades 28 secured at one end to ring 29 which is bolted to casing 10 and at their opposite ends to annular ring 30 situated in a recess in the part 25.

The axially inner end of the hollow shaft part 15 of the driving member is enlarged to provide an internal pilot bearing 31 for the journal provided by an axially extending bearing part 32 affixed to the inner end of shaft part 21. Preferably, the impelled or turbine part 23 is keyed to the shaft part 21 and the bearing part 32 is secured on the end of shaft part 21 as a locking member, suitable packing being provided between parts 21 and 32 to prevent leakage of operating fluid therebetween from chamber 11. Between the part 32 and the hollow shaft part 15 packing is provided to prevent flow of fluid which may pass bearing 31 to the space within the hollow shaft parts. This packing means comprises in the present embodiment a packing ring 33 affixed to the shaft part 15 and having a radially extending face against which a packing ring 34 abuts. Ring 34 is pressed against ring 33 by means of a coil spring 35 located between ring 34 and part 32, and the space between these parts is sealed by means of an expansible bellows member 36 attached to the parts. Similar packing means is provided between the journal bearing 13 and bearing 12. This packing means comprises a bearing ring 37 affixed to the shaft part 15 and having a radially extending bearing surface against which the stationary packing ring 38 is pressed by means of spring 39. Spring 39 abuts against a part attached to the stationary casing structure, and ring 38 is connected to this stationary part by means of an expansible bellows member 40. Similar packing means is provided between the driven member and the bearing 22 supporting the shaft part 21. This packing means comprises a packing ring 41 fixed to shaft 21 and a cooperating packing ring 42 pressed against ring 41 by means of spring 43 located between ring 42 and a stationary part 44 attached to the casing. The space between ring 42 and part 44 is closed by means of the expansible bellows member 45 attached at its ends to these parts.

Extending through the bore provided by hollow shaft parts 15 and 21 is a shaft 46, supported at its forward end in ball bearing 47 and at its rearward end in a ball bearing not shown. Adjacent to its forward end shaft 46 has a clutch plate 49 splined thereto.

Shaft 50, which may be any suitable power shaft and which in the present instance is indicated as the crankshaft of an engine or the like, has secured thereto a fly-wheel 51 which provides a housing for mounting bearing 47, and which also provides a housing for the clutch mechanism comprising clutch plates 19 and 49. As will be observed from the drawings, these clutch plates are located in a suitable recess in the fly-wheel, and between them there is located the annular ring 52, which is axially shiftable with respect to the fly-wheel, but not rotatable with respect thereto. An annular cover plate 53 suitably bolted to the fly-wheel provides a clutch surface 54 on its inner face, and the fly-wheel provides a clutch surface 55 opposite surface 54. Ring 52 is shifted axially by means of a series of peripherally spaced axially extending pins 56 which project through the cover plate 53 and at their outer ends are pivoted to levers 57. At their radially inner ends levers 57 engage suitable recesses in angle members 59 fixed to an annular spring plate 60 which extends radially outwardly from a ring 61 carried by ball bearing 62 and guided in a circular flange 63 on the cover plate 53. The inner race of bearing 62 is fixed to one end of a sleeve member 64 which at its other end is guided on a journal on the stationary part 65 bolted to a part of the main casing. Sleeve member 64 is provided with an external annular groove 66. Parts 61 and 64 are axially slidable with respect to parts 63 and 65, and part 61 is rotationally movable with respect to part 64 due to the interposition of bearing 62.

The specific clutch structure just described forms no part of the invention claimed herein, but is shown by way of example to illustrate how power may be transmitted alternatively through a power shaft such as shaft 50 to either a primary member 14 of the hydraulic power transmitting mechanism, or to the direct drive mechanism comprising the shaft 46. It will be understood that other clutch means may be employed for effecting this function.

In the form of apparatus illustrated, it will be evident that one or the other of the two clutch plates 19 or 49 may be engaged by shifting the part 64 axially, the spring plate 60 and levers 57 providing a spring-pressed toggle mechanism for maintaining either one or the other of the clutch plates in engagement between the clutch ring 52 and one or the other of surfaces 54 and 55. Part 64 may be shifted axially by any suitable form of shifting fork which may advantageously be carried in a housing bearing such as the bearing indicated at 67.

For transmitting power from the shaft part 21 of the hydraulic mechanism or from shaft 46 to the driven shaft 77, mechanism is provided which includes a part 80 having an outer rim providing a ring 81 radially outside of a ring 78 fixed on the hollow shaft part 21. The ring parts 78 and 81 form respectively the inner and outer rings of an overrunning roller clutch comprising rollers 82 for transmitting motion in one direction of rotation from the shaft part 21 to the member 80. Member 80 is fixed to the shaft 46. Between part 80 and the driven shaft 77 there is interposed mechanical means providing a reverse gear whereby motion transmitted to part 80 either by the shaft 46 or the shaft part 21 may be transmitted in the same direction or in reverse direction to the driven shaft 77.

The specific form of construction of the reverse gear, of which any suitable type may be employed, is not a part of the present invention, nor is a description thereof necessary to an understanding of the invention. Consequently, detailed description of this portion of the illustrated embodiment has been omitted.

The operation of the mechanism in transmitting power from shaft 50 to shaft 77 is as follows. In the position of the parts as shown in Fig. 1, the clutch plate 49 is shown as in engagement and power delivered to the fly-wheel 51 is transmitted through this clutch plate to the shaft 46 and from this shaft directly to part 80, from which latter part power may be transmitted in either the same or in reverse direction through the reverse gear parts to the driven shaft 77. When drive is effected through the shaft 46, the primary member of the hydraulic mechanism is released due to the release of the clutch plate 19 when plate 49 is engaged, and the secondary or turbine member of the hydraulic mechanism is also disengaged because of the overrunning clutch interposed between the part 80 and the shaft 21, which clutch is arranged to overrun when the part 80 tends to turn more rapidly than part 21 in the normal direction of movement of these parts, which may be assumed to be clockwise as viewed from the left of the figure. Thus, when the parts are in the position shown, the entire hydraulic mechanism is idle since no drive is transmitted to either the primary or the secondary member of the hydraulic mechanism, and as previously noted the casing forming a part of this mechanism is stationary. If the clutch mechanism is shifted so as to engage clutch plate 19 and release plate 49, drive from shaft 50 is transferred through shaft 15 to the primary or impeller member of the hydraulic mechanism, and rotation of the ring of pump blades 17 in the closed chamber 11, which is completely filled with a suitable power transmitting liquid, causes circulation of the liquid in a closed path of flow radially outwardly from the pump blades through the ring of turbine blades 27, the ring of stationary blades 28 and the second ring of turbine blades 24. This circulation of the hydraulic liquid causes the secondary member 20 to rotate in the same direction as the primary member, and power is transmitted from the hollow shaft part 21 to the member 80 through the clutch rollers 82 which engage to transmit drive when the part 21 tends to rotate in its normal direction of rotation more rapidly than the part 80. As in the case of direct drive through shaft 46 the driven shaft 77 may have motion transmitted to it in either the same or reverse direction from the part 80 through suitable reverse gear mechanism. Obviously, if no reversal of the shaft 77 is required the part 80 may be directly connected to shaft 77, and the reverse mechanism omitted.

Turning now more particularly to the features of construction shown in Fig. 1, it will be observed that by making the primary and secondary members of the hydraulic power transmitting mechanism with hollow shaft parts co-axially mounted, there is provided at the longitudinally central axis of the transmission a bore through which a shaft can extend for direct transmission of power from the source of power to the driven shaft of the apparatus. By this arrangement both variable speed hydraulic drive and direct drive may be provided for a variable speed transmission which is substantially as compact and of as suitable form for installation in the usual automotive or other like vehicle as is a hydraulic variable speed transmission of the same general type as that disclosed. Stated in another way, the provision of major hydraulic parts comprising axially aligned hollow shaft parts permits the addition of a direct drive feature to be used in conjunction with the hydraulic mechanism without material complication of or substantial change in the characteristics of the hydraulic mechanism.

It will further be observed that by mounting the forward end of the driven member of the hydraulic mechanism in a pilot bearing in the driving member, the main rotating parts of the hydraulic mechanism may be rigidly mounted within a comparatively short axially extending space, which in the present embodiment is represented by the distance between the bearings 12 and 22. The driving member is held in alignment between the spaced bearings 12 and 13, and the driven member is held in alignment between the bearings 22 and 31. If it were not for mounting the forward end of the driven member in the pilot bearing, a second bearing rearwardly of bearing 22 would be required to hold this part in alignment and this would involve additional axial length of the transmission. It will be appreciated that for automotive and like installations, the saving in space is of material practical importance.

It is evident that the efficiency of operation of the hydraulic transmission would be greatly impaired by large clearances between the rotating members and the stationary casing parts, and also by large clearances between the adjacent parts of the relatively rotating driving and driven members. By mounting one of the members in a pilot bearing in the other it is evident that not only a relatively rigid mounting is obtained for the members with respect to the casing, but also relative movement of one member with respect to the other due to worn bearings is minimized. This construction enables close initial clearances to be employed and materially assists in maintaining close initial clearances over long periods of use.

By means of the pilot bearing and packing arrangements shown, any substantial amount of leakage of operating fluid from the chamber 11 through the hollow shaft parts is prevented.

It will further be noted that the arrangement shown provides for separation of the ball bearings from contact with operating fluid so that these bearings may be adequately lubricated with suitable lubricating oil. The pilot bearing is preferably, as shown, a plain journal bearing, and adequate lubrication of this bearing may be obtained from the operating fluid which is usually of a somewhat oily character. For example, we have found a most suitable and satisfactory operating fluid to be kerosene containing a small quantity, such, for example, as about five per cent (5%) of lubricating oil. The journal bearing 13, however, may be lubricated from an external lubricator through the channel 127. Such operating fluid as may leak past the several packings to the interior of the hollow shaft parts 15 and 21 is preferably kept from flowing longitudinally of the shaft parts by means of suitable internal recesses in these parts and cooperating ridges on the shaft 46, the recesses being connected through drain channels for conducting fluid from the transmission. These drain channels need not be described in detail.

Turning now to the embodiment illustrated in Figs. 2 and 3, the clutch arrangement at the forward end of the transmission is similar to that previously described in connection with Fig. 1. In the present embodiment, the driving member of the hydraulic mechanism comprises a hollow member 15a and a disk-like impeller part 16a carrying a ring of impeller blades 17a. The driven member comprises a hollow shaft part 21a and a turbine part 23a, the latter carrying three rings of turbine blades 27a, 24a and 128. The inner ends of the impeller or pump blades 17a are attached to ring 18a, and the inner ends of turbine blades 128 carry ring member 25a, to which the blades 27a and 24a are attached. The outer ends of blades 24a are secured to ring 130. Rings of stationary guide blades 28a and 131 are carried by the casing. The inner ends of blades 131 are connected by the ring 30a situated in a suitable recess in the part 25a. It will be evident that as the operating fluid is circulated in a closed path of flow in the chamber 11a, it will tend to leak out from its confined path through the clearance spaces between the relatively moving ring parts and between some of these ring parts and the walls of the casing 10a which, together with these parts, defines the path of flow. Such leakage is detrimental to the efficiency of operation of the transmission mechanism, and in order to minimize this leakage we provide between the several relatively rotating parts cooperating projections and recesses which form in effect labyrinth packings providing substantial resistances to leakage flow. This construction is shown more clearly in Fig. 3 with respect to the part 29a fixed to the transmission, which carries the ring of stationary guide blades 131, and the rotating parts 23a and 130. Part 29a is flanged at 132 and 133, and these flanges are recessed at 134 and 135 respectively. Parts 23a and 130 are similarly flanged, and the flanged portions are provided with recesses 136 and 137, which cooperate respectively with recesses 134 and 135 to provide what may be termed labyrinth packings comprising a series of spaced annular clearances 138 and 139. The annular clearance spaces separated by the recesses provide a tortuous path of flow for operating fluid, the nature of which tends to create turbulence in the flow of fluid and consequently minimizes leakage. Similar labyrinth packing is provided between other of the relatively rotating parts as, for example, as indicated generally at 140 in Fig. 3.

It will further be evident that the operating fluid circulating in the closed path of flow in chamber 11a will exert an axial pressure on the parts 16a and 23a, tending to force them axially apart. This axial thrust is balanced to a considerable degree by the pressure of fluid in the spaces 141 and 142 provided between the stationary casing parts and the parts 16a and 23a respectively. Fluid under pressure enters space 141 by way of clearance space between ring 129 and the casing 10a, and fluid enters the space 142 by way of clearance space between the ring 130 and the casing 10a. In order to prevent this relatively high pressure prevailing in spaces 141 and 142 from reaching the inner portion of the apparatus, labyrinth packings 143 and 144 are provided between parts 16a and 23a respectively and adjacent parts of the stationary casing structure. These packings comprise cooperating projections and recesses similar to those described above with reference to Fig. 3. It will be noted that there is a relatively large space 145 between the main casing and the radially inner portion of the part 23a, and in order to minimize the losses due to turbulence of fluid in this space, a stationary baffle plate 146 is provided adjacent to the radially inner portion of part 23a. This baffle serves to maintain the fluid in the space 145 in substantially quiescent state when the turbine member is rotating.

The pilot bearing arrangement in the present embodiment is different from that shown in Fig. 1. The driven member in this instance is rotatably supported in the casing by the ball bearing 22a and the journal bearing 13a, the latter being formed in the stationary casing part 147. The turbine part 23a provides a cylindrical journal 148 for the pilot bearing 149 formed in the annular extension 150 of the impeller part 16a of the driving member. The driving member is supported by pilot bearing 149 and ball bearing 12a. It will be evident that this arrangement provides the same compactness axially of the parts, and insures the same alignment of the parts as the arrangement previously described in connection with Fig. 1.

As in the arrangement shown in Fig. 1, packings are provided between the casing and the driving and driven members of the hydraulic mechanism, and packing is provided between these members. The construction and arrangement of the packings is substantially the same as that previously described, corresponding parts being designated by the same reference characters with the suffix a and need not again be described in detail.

Fig. 4 illustrates still another embodiment of apparatus in which the driving and driven members of the hydraulic mechanism are mounted in plain journal bearings. The driving member 14b comprises a hollow shaft part 15b and an impeller part 16b and is mounted in a plain bearing indicated generally at 175, in the casing 10b. This bearing comprises a cylindrical bearing surface 175a and a radially extending bearing surface 175b, so that the bearing provides not only radial support for the driving member but also provides a surface for preventing axial displacement of this member. The driven member 20b is mounted in the casing in bearing 176, which has a cylindrical portion 176a and a radially extending bearing surface 176b. The shaft part 21b of the driven member is provided with a forwardly projecting annular extension 177 projecting into a suitable recess in the extension 178 of the driving member 14b. Extension 177 is journalled in the driving member by means of a pilot bearing, which in the present instance comprises the spaced cylindrical bearing surfaces 179 and 180 and a radially extending bearing surface 181 provided between the driven member 20b and the axially extending extension 178 on the driving member. From the drawings it will be evident that the above described arrangement provides for holding the driving and driven members of the hydraulic mechanism in proper co-axial alignment with respect to each other and with respect to the axis of the casing, and also provides against axial end-play of the members both with respect to each other and with respect to the casing. In this arrangement, as in the arrangement previously described, packing is provided between the driving and driven members for preventing flow of fluid to the spaces in which the central shaft 46 is located. This packing, it will be observed, is in all the several embodiments arranged with respect to the pilot bearing so that any fluid passing from the working chamber of the transmission to the space in which the driving shaft is located must force its way serially past bearing surfaces of considerable area and also past the packing, which may be said to be arranged in series with respect to leakage flow. This minimizes the possibility of leakage of operating fluid from the main operating chamber at this point, and also minimizes the possibility of air passing to the operating chamber from the space around the central drive shaft under conditions of operation which might produce negative pressure of the operating fluid in the radially inner portion of the main chamber. In the present embodiment packings of the type already described are provided between the hollow shaft parts 15b and 21b and the casing, to prevent leakage of operating fluid around the outside of these shaft parts.

From the foregoing description it will be evident that the invention may be carried into effect with different specific forms of apparatus, and it is accordingly to be understood that the invention embraces all such changes and modifications in the apparatus herein illustrated by way of example, as may fall within the scope of the appended claims when they are construed as broadly as is consistent with the state of the prior art.

It will further be understood that certain features of the invention may be used to the exclusion of others.

What we claim is:

1. In a variable-speed power transmission, a casing providing a chamber for operating fluid, hydraulic variable-speed power transmitting mechanism comprising a driving member and a driven member, the driving member comprising a shaft portion, a hub portion and a disc portion located in said chamber and carrying a ring of impeller blades, the driven member comprising a shaft portion, a hub portion and a disc portion located in said chamber and carrying a ring of impelled blades, said impeller blades and said impelled blades being arranged to transmit power from the driving member to the driven member and said shaft parts being in axial alignment, the exterior of said hub portions being shaped to define the radially inner part of a closed path of flow for the operating fluid, one of said hub portions being recessed axially and the other of said hub portions having a cooperating axial extension to provide therebetween a pilot bearing, and bearings for rotatably mounting each of said members in said casing.

2. In a variable-speed power transmission, a non-rotatably mounted casing providing a chamber for operating fluid, hydraulic variable-speed power transmitting mechanism comprising a driving member having a hollow shaft part rotatably mounted in said casing and an impeller part in said chamber, a driven member having a hollow shaft part rotatably mounted in said casing and an impelled part in said chamber arranged to receive operating fluid discharged from said impeller part, said hollow shaft parts being mounted in axial alignment and providing an axially central passage adapted to receive a power transmitting shaft passing therethrough, a pilot bearing between adjacent ends of said driving and driven members and annular packing means between said driving and driven members, said packing means and said pilot bearing being arranged serially in the line of flow of leakage fluid passing from said chamber to the passage provided by the hollow shaft parts of said members.

3. In a variable-speed power transmission, a non-rotatably mounted casing providing a chamber for operating fluid, hydraulic variable-speed power transmitting mechanism comprising a driving member having a hollow shaft part rotatably mounted in said casing and an impeller part in said chamber, a driven member having a hollow shaft part rotatably mounted in said casing and an impelled part in said chamber arranged to receive operating fluid discharged from said impeller part, said hollow shaft parts being mounted in axial alignment and providing an axially central passage adapted to receive a power transmitting shaft passing therethrough, a pilot bearing between adjacent ends of said driving and driven members and annular packing means between said driving and driven members, said packing means being located between said pilot bearing and said axially central passage.

4. In a variable speed power transmission of the kind in which power is transmitted from a driving shaft to a driven shaft by circulation of a working fluid in a closed path of flow in a working chamber, a driven member having a turbine portion located in said chamber and a hollow shaft portion extending therefrom to transmit power to the driven shaft, and a driving member including pumping means arranged to be rotated by the driving shaft to circulate working fluid in said chamber, said driving member having a hollow central portion in alignment with the hollow shaft portion of the driven member to provide an axially central passage for the reception of a power transmitting shaft capable of rotating at a speed different from the speed of either of said members and adapted to be connected to and driven from said driving shaft.

5. In a variable speed power transmission of the kind in which power is transmitted from a driving shaft to a driven shaft by circulation of a working fluid in a closed path of flow in a working chamber, a driven member having a turbine portion located in said chamber and a hollow shaft portion extending therefrom to transmit power to the driven shaft, and a driving member including pumping means arranged to be rotated by the driving shaft to circulate working fluid in said chamber, said driving member having a hollow central portion in alignment with the hollow shaft portion of the driven member to provide an axially central passage for the reception of a power transmitting shaft capable of rotating at a speed different from the speed of either of said members and adapted to be mechanically driven from said driving shaft, and an annular pilot bearing between said members, said pilot bearing having a diameter greater than the minimum diameter of the passage provided by the hollow portions of said members.

6. In a variable speed power transmission of the kind in which power is transmitted from a driving shaft to a driven shaft by circulation of a working fluid in a closed path of flow in a working chamber, a driven member having a turbine portion located in said chamber and a hollow shaft portion extending therefrom to transmit power to the driven shaft, and a driving member including pumping means arranged to be rotated by the driving shaft to circulate working fluid in said chamber, said hollow shaft portion of the driven member providing an axially central passage for the reception of a power transmitting shaft adapted to be mechanically driven from said driving shaft and extending from said driving member through the hollow shaft portion of the driven member and capable of rotating at a speed different from that of said driven member, and an annular pilot bearing between said members, said pilot bearing having a diameter greater than the minimum diameter of the passage provided by the hollow shaft portion of said driven member.

ALF LYSHOLM.
FRED HORNEY.
GÖSTA WAHLSTEN.